United States Patent [19]

Mori et al.

[11] 3,863,141

[45] Jan. 28, 1975

[54] FREQUENCY ANALYZING APPARATUS FOR USE WITH AN EDDY CURRENT DETECTOR

[75] Inventors: Toshihiro Mori, Yokohama; Seigo Ando, Kawasaki, both of Japan

[73] Assignee: Nippon Kokan Kabushiki Kaisha, Tokyo, Japan

[22] Filed: Aug. 14, 1973

[21] Appl. No.: 388,155

[30] Foreign Application Priority Data
Aug. 29, 1972 Japan............................. 47-86480

[52] U.S. Cl................................. 324/37, 324/78 R
[51] Int. Cl........................ G01r 33/12, G01r 23/02
[58] Field of Search ......... 324/78 R, 78 F, 78 J, 37, 324/40; 330/104, 109

[56] References Cited
UNITED STATES PATENTS

| | | | |
|---|---|---|---|
| 2,882,488 | 4/1959 | Price et al............................ | 324/37 |
| 3,299,367 | 1/1967 | Howden.............................. | 330/104 |
| 3,643,173 | 2/1972 | Whitten.............................. | 330/109 |

*Primary Examiner*—Gerard R. Strecker
*Attorney, Agent, or Firm*—Flynn & Frishauf

[57] ABSTRACT

A frequency analyzing apparatus comprising an amplifier, a negative feedback circuit connected between the input and output terminals of the amplifier and a positive feedback circuit having a property of frequency selectivity and connected similarly between the input and output terminals of the amplifier.

6 Claims, 10 Drawing Figures

FREQUENCY ANALYZING APPARATUS FOR USE WITH AN EDDY CURRENT DETECTOR

BACKGROUND OF THE INVENTION

This invention relates to a frequency analyzing apparatus comprising an amplifier provided with a feedback circuit having a property of frequency selectivity and more particularly to a frequency analyzing apparatus having a property of prominently high selectivity with respect to a band of low frequencies.

A frequency analyzing apparatus is used with an eddy current defect detector for examining the presence of any defect, for example, in a metallic body. The prior art eddy current defect detector has a detection coil connected to one arm of a bridge circuit supplied with a reference signal from an oscillator so as to detect a defect by means of eddy current. The detection coil is disposed close to a metallic body being examined for the presence of a defect. Eddy currents created in a metallic body by a magnetic flux delivered from the detection coil presents a changed magnitude at a defective spot, giving rise to a variation in the impedance of the detection coil and consequently in an output from the bridge circuit. An output from the bridge circuit is supplied to a synchronous detector together with a signal formed with a referential phase by properly shifting the phase of the original referential signal or output signal of the oscillator so as to be subjected to synchronous detection. A detection output has its frequency analyzed by a filter. Thus, the prior art eddy current defect detector uses the filter as a frequency analyzer, since low frequencies are generally analyzed, the filter is a band-pass filter consisting of an integration circuit comprising a resistor and capacitor combined with a differentiation circuit. The integration circuit eliminates a carrier from a referential signal included in an output derived from synchronous detection and also a signal component of high frequency band. A signal leaving to integration circuit is conducted to the differentiation circuit which eliminates a signal component of low frequency band.

However, the above-mentioned integration circuit consisting of a resistor and a capacitor and differentiation circuit have such frequency characteristics that gradients at the rising and falling sections of the characteristic envelope each indicate about 6 dB per octave, namely, the gradients are not sharp enough to be used as an analyzer of low frequencies in measuring eddy current.

SUMMARY OF THE INVENTION

It is accordingly the object of this invention to provide a frequency analyzing apparatus displaying prominent frequency characteristics with respect to a band of even low frequencies.

According to an aspect of this invention, there is provided a frequency analyzing apparatus which comprises an amplifier and a feedback circuit having a property of frequency selectivity and connected between the input and output terminals of the amplifier.

DESCRIPTION OF THE PREFERRED EMBODIMENTS

Figure 1:
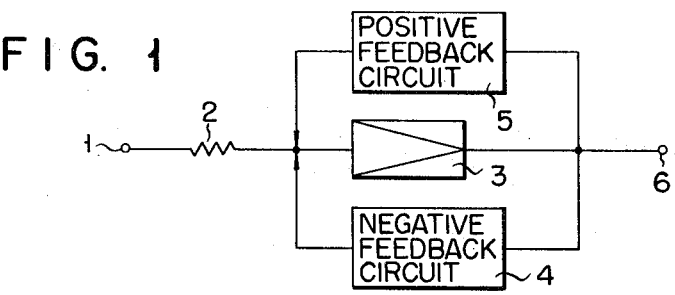
FIG. 1 is a schematic block diagram showing the principle of a frequency analyzing apparatus embodying this invention.

Referring to FIG. 1, an output signal requiring its frequency to be analyzed which has been delivered from a synchronous detector included in the eddy current defect detector is conducted to the input terminal 1 of the subject frequency analyzing apparatus. The input terminal 1 is connected to one end of an input resistor 2, the other end of which is connected to the input terminal of an amplifier 3. Between the input and output terminals of the amplifier 3 are connected a negative feedback circuit 4 and a positive feedback circuit 5 having a property of frequency selectivity. The output terminal of the amplifier 3 is connected to the output terminal of the frequency analyzing apparatus.

A signal requiring its frequency to be analyzed which is conducted to the input terminal 1 of the frequency analyzing apparatus is amplified by the amplifier 3. An amplified signal is fed back to the input side of the amplifier 3 through the negative and positive feedback circuits 4 and 5. Since the positive feedback circuit 5 has, as previously described, a property of frequency selectivity, only a signal having a specified frequency is positively fed back. Namely, the voltage of a positively fed back signal varies with its frequency. Thus an output signal from the amplifier 3 which is brought to the output terminal 6 of the frequency analyzing apparatus has a specified frequency. The amplifier 3 comprising the positive feedback circuit 5 having the above-mentioned property of frequency selectivity amplifies an input signal, thereby rendering the frequency selectivity of the positive feedback circuit 5 more prominent, and in consequence delivering an output signal bearing an extremely sharp pattern of frequency characteristics from the output terminal 6 of the frequency analyzing apparatus. The negative feedback circuit 4 used in said apparatus has a property of elevating the amplification and a stability of the amplifier 3 and the signal-to-noise ratio, but is not indispensable for the object of this invention.

Figure 2:
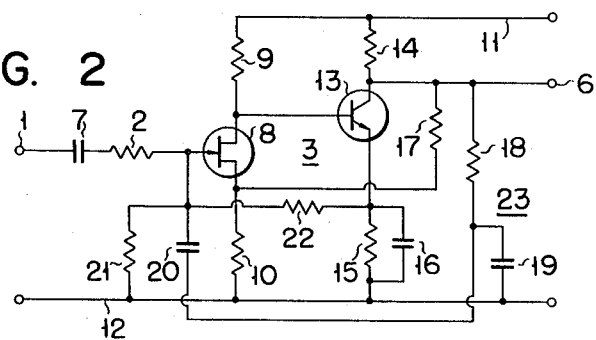
FIG. 2 is a circuit diagram of a frequency analyzing apparatus according to an embodiment of the invention.

There will now be described by reference to the appended drawings the preferred embodiments of this invention. Referring to FIG. 2, the input terminal 1 of the frequency analyzing apparatus which is supplied with a signal requiring its frequency to be analyzed is connected to the gate of a field effect transistor 8 (hereinafter abbreviated as "FET") through a series circuit consisting of a coupling capacitor 7 for shutting off direct current and an input resistor 2. The drain and source of the FET 8 are connected to a positive power supply line 11 and ground line 12 respectively through the corresponding drain resistor 9 and source resistor 10. The drain of the FET 8 is further connected to the base of an NPN transistor 13, the collector and emitter of which are connected to the positive power supply line 11 and ground line 12 respectively through the corresponding collector resistor 14 and emitter resistor 15. Parallel to the emitter resistor 15 is connected a bypass capacitor 16. The collector of the NPN transistor 13 is connected to the source of the FET 8 through a negative feedback resistor 17. Thus the FET 8 and NPN transistor 13 jointly constitute a two-stage coupled negative feedback amplifier 3.

Figure 3:
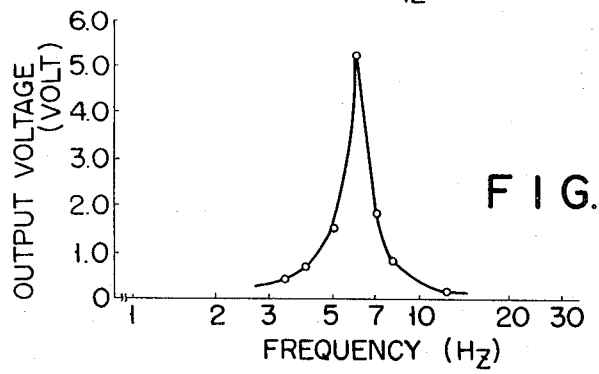
FIG. 3 is a curve diagram showing the frequency characteristics of the circuit of FIG. 2.

The output terminal of the amplifier 3, namely, the collector of the NPN transistor 13 is connected to the ground line 12 through an integration circuit consisting of a resistor 18 and capacitor 19. The junction of the resistor 18 and capacitor 19 is connected to the ground line 12 through a differentiation circuit consisting of a compacitor 20 and resistor 21. The junction of the capacitor 20 and resistor 21 is connected to the gate of the FET 8, and further to the emitter of the NPN transistor 13 through a biasing resistor 22. The integration circuit consisting of the resistor 18 and capacitor 19 and the differentiation circuit consisting of the capacitor 20 and resistor 21 jointly constitute a band-pass filter 23, which acts as a positive feedback circuit with respect to the amplifier 3. A composite resistor element actually acting as a resistor in the differentiation circuit included in the band-pass filter 23 consists of the resistor 21, bypass resistor 22 and input resistor 2. The central frequency $f_0$ of the band pass filter 23 may be expressed by the following equation:

$$f_0 = \tfrac{1}{2}\pi\, R_o\, C_0 \quad [Hz]$$

where:
$C_0$ = the capacitance of the capacitors 19 and 28
$R_0$ = the value of the resistors 2, 18 and 21

Where a signal requiring its frequency to be analyzed is supplied to the input terminal 1 of the frequency analyzing apparatus of this invention arranged as described above, said signal is amplified to the desired extent by the two-stage coupled negative feedback amplifier 3 and conducted to the output terminal 6 of said frequency analyzing apparatus. Those of the signals brought to the output terminal 6 which bear the prescribed frequency bands are filtered by the band-pass filter 23 and positively fed back to the input terminal of the amplifier 3. Namely, a positive feedback voltage obtained at this time originates with the signals having the selected frequency bands. Accordingly, the desired frequency band component of the signal requiring its frequency to be analyzed which is supplied to the input terminal of the frequency analyzing apparatus is selectively amplified, presenting, as shown in FIG. 3, a very sharp pattern of relationship between frequencies and resulting output voltages. In FIG. 3 the sharp gradients each indicate 28 to 30 dB per octave, a value about 4 to 5 times what was possible with the prior art apparatus, proving that the frequency analyzing apparatus of this invention has a prominent performance.

Referring to FIG. 2, an amount of positive feedback obtained through the band-pass filter 23 can be adjusted by controlling its property. Further, the central frequency of an output signal from the band-pass filter 23 can be changed by varying its central frequency $f_0$. All the above-mentioned adjustments can be effected by changing the values of the circuit elements constituting the band-pass filter 23.

There will now be described by reference to FIG. 4 a frequency analyzing apparatus according to another embodiment of this invention. The parts of FIG. 4 the same as those of FIG. 2 are denoted by the same numerals. The input terminal 1 of the frequency analyzing apparatus is connected to the gate of the FET 8 through the input resistor 2 and coupling capacitor 7. The sources of the FET's 8 and 24 are jointly connected to the ground line 12 through the corresponding source resistors. The drain of the FET 24 is connected to the positive power supply line 11 through a corresponding drain resistor 25. The gate of the FET 8 is connected to the ground line 12 through a biasing resistor 26. The FET's 8 and 24 collectively constitute a differential amplifier 27, an output signal from which is conducted from the drain of the FET 24 to the base of the NPN transistor 13. The negative feedback resistor 17 is connected between the collector of the NPN transistor 13 and the junction of the resistor 2 and the capacitor 7. The band-pass filter 23 is connected between a terminal 28 connected to the collector of the NPN transistor 13 and a terminal 29 connected to the gate of the FET 24.

Under the above-mentioned arrangement, an input signal supplied to the input terminal 1 is amplified by the differential amplifier 27 and further by the NPN transistor 13 and thereafter fed back to the gate of the FET 24. Accordingly, the negative feedback amplifier 3 consisting of the differential amplifier 27 and NPN transistor 13 presents, as in the embodiment of FIG. 2, such amplification characteristics as are very sharply selective of frequency. The embodiment of FIG. 4 in which an input signal and a positively fed back signal through separate routes offers the advantage of providing a large input impedance and a small output impedance, thereby stabilizing the circuit operation.

Figure 4:
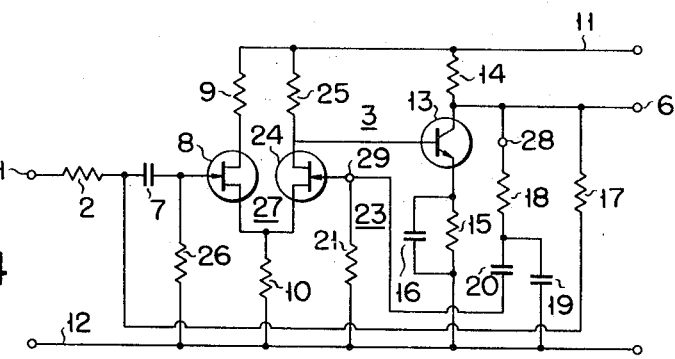
FIG. 4 is a circuit diagram of a frequency analyzing apparatus according to another embodiment of the invention.
Figure 5:
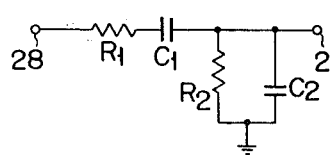
FIGS. 5, 6 and 7 present concrete feedback circuits used in the frequency analyzing apparatus of the invention.
Figure 6:
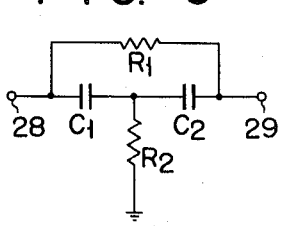
Figure 7:
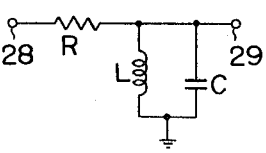

Referring to the embodiment of FIG. 4, the positive feedback circuit having a property of frequency selectivity which is connected between the terminals 28 and 29 may be replaced by any one of circuit networks shown in FIGS. 5 to 7.

Even this arrangement attains the same effect. Any of these feedback circuits which have specific filter characteristics may be connected between the terminals 28 and 29. The feedback circuit of FIG. 5 has a resistor $R_1$ and capacitor $C_1$ connected in series between the terminals 28 and 29, and a resistor $R_2$ and capacitor $C_2$ connected parallel between the terminal 29 and the ground. The central frequency $f_0$ associated with the filter characteristics of the feedback circuit of FIG. 5 may be expressed by the following equation:

$$f_0 = 1/2\pi\ \sqrt{R_1 R_2 C_1 C_2} \quad [Hz]$$

Assuming $R_1 = R_2 = R$ and $C_1 = C_2 = C$, then there results $$f_0 = 1/2\pi RC \quad [Hz]$$

The positive feedback circuit or filter of FIG. 6 has a series circuit of capacitors $C_1$ and $C_2$ and a resistor $R_1$ connected parallel between the terminals 28 and 29, and a resistor $R_2$ connected between the junction of the capacitors $C_1$ and $C_2$ and the ground. The central frequency $f_0$ associated with the filter characteristics of the feedback circuit of FIG. 6 may be expressed by the following equation:

$$f_0 = 1/\sqrt{C_1 C_2 R_1 R_2} \quad [Hz]$$

Assuming $C_1 = C_2 = C$, then there results $$f_0 = 1/C\sqrt{R_1 R_2} \quad [Hz]$$

While the resistor $R_1$ generally has a larger value than the resistor $R_2$, the larger the ratio which the value of the resistor $R_1$ bears to that of the resistor $R_2$, the sharper the envelope of the frequency characteristics of the feedback circuit of FIG. 6.

The positive feedback circuit or filter of FIG. 7 has a resistor R connected between the terminals 28 and 29, and an inductor L and capacitor C connected parallel between the terminal 29 and the ground. The central frequency $f_0$ associated with the filter characteristics of the feedback circuit of FIG. 7 may be expressed by the following equation:

$$f_0 = 1/2\pi\sqrt{LC}$$

The above-mentioned filters of FIGS. 5, 6 and 7 themselves do not display a very sharp envelope of frequency characteristics. Where, however, combined with, for example, the negative feedback amplifier 3 of FIG. 4, then the filters can produce an amplified output bearing such a sharp envelope of frequency characteristics as is shown in FIG. 3.

Figure 8:
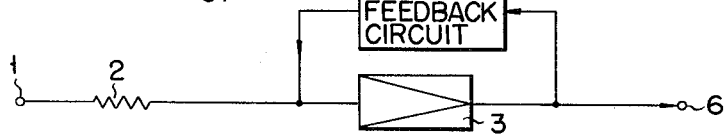
FIG. 8 is a block circuit diagram of a frequency analyzing apparatus according to still another embodiment of the ivention.

There will now be described the example where the frequency analyzing apparatus of this invention is used with an eddy current defect detector. Eddy current defect detection is carried out by causing a band-shaped metal strip being examined for the presence of a defect to travel at a fixed speed and disposing a detection coil close to the traveling band-shaped metal strip. If, in this case, the metal strip is made to travel at a fixed speed relative to the detection coil, then the physical properties of a detected defect portion of the metal strip will be disclosed by measuring the central frequency of an output signal from the eddy current defect detector. However, the irregular speed of the traveling metal strip would present data on said defective portion from being accurately obtained. If the central frequency $f_0$ associated with the frequency characteristics of a band-pass filter is changed by an electric signal denoting the traveling speed of the object metal strip at a given time, then the eddy current defect detector will always indicate the condition of a detected defect, regardless of the traveling speed of the metal strip. To this end, it is advised, as shown in FIG. 8, to generate from a speed-electric signal transducer 31 the voltage of a signal showing the traveling speed of the object metal strip and impress the voltage of said signal on the positive feedback circuit 5 including a resistor or capacitor whose value varies with the voltage of said speed signal. This process will automatically control the central frequency $f_0$ associated with the frequency characteristics of the band-pass filter.

Figure 9:
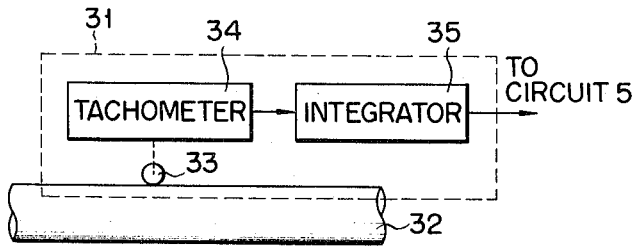
FIG. 9 is a block diagram of a device used in FIG. 8 to detect a signal denoting the traveling speed of a metallic body being examined for the presence of a defect.

FIG. 9 illustrates the arrangement of the speed-electric signal transducer 31, which includes a tachometer 34 having its roller 33 so disposed as to contact a metallic body 32 being examined for the presence of a defect, thereby obtaining a signal denoting the traveling speed of the metallic body 32. The speed signal is conducted to an integrator 35 where a pulsating noise component is eliminated from the speed signal. Thus the integrator 35 supplies the positive feedback circuit of FIG. 8 with a voltage signal having an amplitude corresponding to the traveling speed of the metallic body 32.

Figure 10:
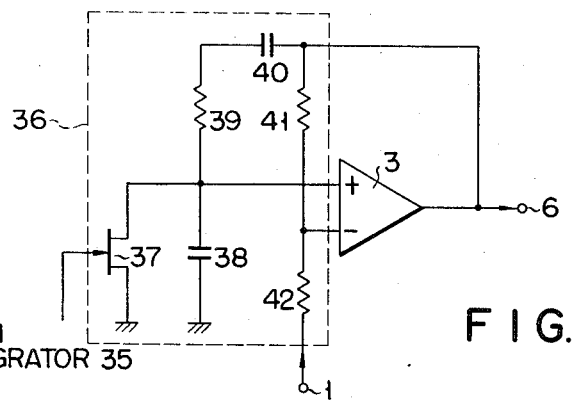
FIG. 10 illustrates the feedback circuit of FIG. 8.

An output from the integrator 35 is supplied to the gate of an FET 37 included in the Wien bridge circuit of FIG. 10. The drain of the FET 37 is grounded through a capacitor 38 and also connected to one side of a capacitor 40 through a resistor 39. The opposite side of the capacitor 40 is connected to the input terminal 1 of the frequency analyzing apparatus through resistors 41 and 42, and also to the output terminal 6 of said apparatus. Outputs from the Wien bridge circuit 36 are delivered from the junction of the capacitor 38 and resistor 39 as well as from the junction of the resistors 41 and 42. The outputs thus drawn out are supplied to the noninversion and inversion input terminals of the amplifier 3. Assuming that, in the Wien bridge circuit 36, the resistor 39 has a value $R_1$, the FET 37 has a resistance RF across the drain and source, and the capacitors 40 and 38 have capacities $C_1$ and $C_2$ respectively, then the central frequency $f_0$ associated with the frequency characteristics of the Wien bridge circuit 36 may be expressed by the following equation:

$$f_0 = 1/2\pi\sqrt{C_1 C_2 R_1 RF}$$

An output from the eddy current defect detector which has been supplied to the input terminal of the frequency analyzing apparatus is conducted to the amplifier 3 through the resistor 42 so as to have a signal component around the central frequency $f_0$ selectively amplified. At this time, the internal resistance RF of the FET 37 varies with the traveling speed of the metallic body 32, with the resultant change in the central frequency $f_0$ of the Wien bridge circuit 36.

In the foregoing embodiments, the positive feedback circuit was made to have a property of frequency selectivity. However, the same effect will also be attained by causing the negative feedback circuit to have a similar property of frequency selectivity.

If, in the embodiment of FIGS. 8 to 10, the material and traveling speed of an object of examination 32 are fixed in advance, then it will be possible to detect the condition of a defect, if any, in the body of examination 32 with a certain degree of accuracy by checking the frequency of an output signal from the output terminal 6 of the frequency analyzing apparatus, because the frequency of an output signal from said apparatus bears a fixed relationship with the condition of the defect. Further, if the condition of the defect can be forecast for each lot of metal produced by a furnace, then the traveling speed of an object of examination will be predicted conversely from the frequency of an output from the frequency analyzing apparatus.

What we claim is:

1. A low frequency analyzing apparatus for use with an eddy current defect dectector for detecting defects in a moving object, comprising:
   an input terminal supplied with an output signal from the eddy current defect detector which requires its frequency to be analyzed;
   an amplifier coupled to said input terminal for receiving said input signal;
   a frequency selective feedback circuit coupled between the input and output terminals of the amplifier; and a speed-electric signal transducer coupled to said feedback circuit and producing a signal denoting the travelling speed of said moving object being tested for the presence of a defect by the eddy current defect detector, said feedback circuit being responsive to said signal produced by said transducer for varying the central frequency of the feedback circuit.

2. An apparatus according to claim 1 wherein the feedback circuit comprises a negative feedback circuit.

3. An apparatus according to claim 1 wherein the amplifier comprises a negative feedback amplifier and the feedback circuit comprises a positive feedback circuit.

4. An apparatus according to claim 3 wherein the positive feedback circuit comprises an integration circuit and a differentiation circuit each including a resistor and capacitor.

5. An apparatus according to claim 1 wherein the amplifier comprises a negative feedback amplifier comprising a differential amplifier including a first and a second field effect transistor, a transistor amplifier for amplifying an output from the differential amplifier and a negative feedback resistor connected between the output terminal of the transistor amplifier and the input terminal of the differential amplifier; and the feedback circuit comprises a positive feedback circuit.

6. An apparatus according to claim 1 wherein the speed-electric signal transducer comprises a tachometer producing a signal denoting the traveling speed of the object of examination being tested for the presence of a defect and an integrator for integrating an output signal from the tachometer; and the feedback circuit includes a field effect transistor having a resistance across the source and drain thereof which is changed with the voltage level of an output signal delivered from the integrator to the gate of said field effect transistor.

* * * * *